US007065957B2

(12) United States Patent
Balzer

(10) Patent No.: US 7,065,957 B2
(45) Date of Patent: *Jun. 27, 2006

(54) SEGMENTED MIXING DEVICE FOR JET ENGINES AND AIRCRAFT

(75) Inventor: Ronald L. Balzer, Bothell, WA (US)

(73) Assignee: The Boeing Company, Seattle, WA (US)

( * ) Notice: Subject to any disclaimer, the term of this patent is extended or adjusted under 35 U.S.C. 154(b) by 80 days.

This patent is subject to a terminal disclaimer.

(21) Appl. No.: 10/459,918

(22) Filed: Jun. 11, 2003

(65) Prior Publication Data

US 2003/0213227 A1 Nov. 20, 2003

Related U.S. Application Data

(63) Continuation-in-part of application No. 10/351,649, filed on Jan. 23, 2003, now Pat. No. 6,786,037, which is a continuation-in-part of application No. 09/822,962, filed on Mar. 30, 2001, now Pat. No. 6,612,106.

(60) Provisional application No. 60/203,222, filed on May 5, 2000, now abandoned.

(51) Int. Cl.
*F02K 3/02* (2006.01)
*B64C 9/28* (2006.01)
*B64C 15/00* (2006.01)
*F01N 1/14* (2006.01)

(52) U.S. Cl. .......................... 60/204; 60/226.1; 60/262; 60/264; 239/265.19; 181/220; 244/35 R; 244/211

(58) Field of Classification Search .................. 60/204, 60/226.1, 262, 264, 265, 770; 239/251, 265.11, 239/265.12, 265.27, 265.19, 265.1, 265.2; 181/175, 206, 220; 244/3.21, 6, 160, 25, 244/35 R, 198, 211, 218, 213, 45 R, 216, 244/204, 212
See application file for complete search history.

(56) References Cited

U.S. PATENT DOCUMENTS

| 2,800,291 | A | * | 7/1957 | Stephans ..................... 244/200 |
| 3,153,319 | A | * | 10/1964 | Young et al. .......... 239/265.19 |
| 3,578,264 | A | * | 5/1971 | Kuethe ....................... 244/199 |
| 4,311,291 | A | * | 1/1982 | Gilbertson et al. ......... 244/211 |
| 5,088,665 | A | * | 2/1992 | Vijgen et al. ............... 244/200 |
| 6,786,037 | B1 | * | 9/2004 | Balzer .......................... 60/204 |
| 2002/0125340 | A1 | * | 9/2002 | Birch et al. ............ 239/265.11 |
| 2003/0159428 | A1 | * | 8/2003 | Hebert ....................... 60/226.1 |

FOREIGN PATENT DOCUMENTS

JP           354098000 A  *  8/1979

OTHER PUBLICATIONS

D.C. Kenzakowski, J. Shipman, S.M. Dash, J.E. Bridges and N. H. Saiyed, "Turbulence Model Study of Laboratory Jets with Mixing Enhancements for Noise Reduction," AIAA–2000–0219, Jan. 2000.

* cited by examiner

Primary Examiner—Charles G. Freay
(74) Attorney, Agent, or Firm—Conrad O. Gardner; Laurence A. Savage

(57) ABSTRACT

Disclosed is a means for reducing jet engine exhaust noise wherein mixing is enhanced between adjacent exhaust flows and between exhaust flow and free-stream flow. Also disclosed is a means for improving the thrust of jet engines and for reducing the noise and drag of aircraft. The device is a segmented, triangular or trapezoidal shaped, curved extension to a nozzle's sleeve or surface trailing edge that results in a serrated trailing edge. The extensions enhance the natural free mixing of the adjacent flows and therefore reduce the acoustic energy associated with the velocity differences between the streams in which they are imbedded. The novel structure forces adjacent flows to penetrate into one another to a greater depth than that achieved with free mixing and results in a more uniform flow in a shorter stream wise distance. As a result of the enhanced mixing, drag on flow surfaces that are downstream of the devices and are scrubbed by the flows adjacent to the devices can be reduced.

8 Claims, 5 Drawing Sheets

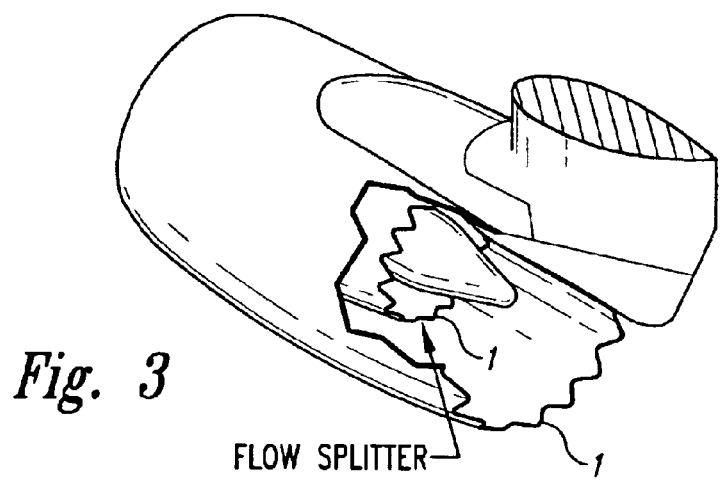
Fig. 3
FLOW SPLITTER
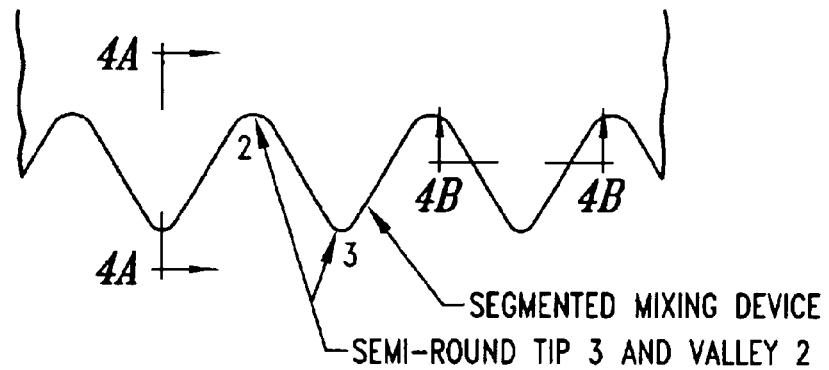
Fig. 4
SEGMENTED MIXING DEVICE
SEMI-ROUND TIP 3 AND VALLEY 2
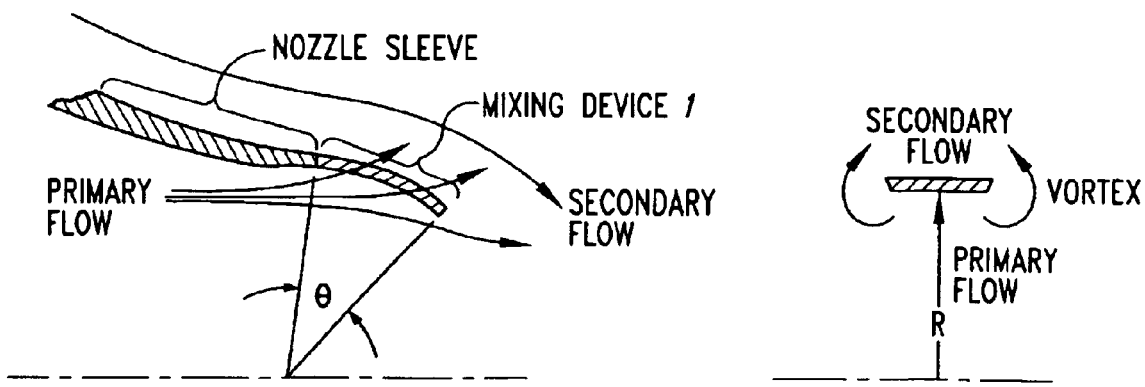
Fig. 4A
Fig. 4B

SEGMENTED MIXING DEVICE FOR JET ENGINES AND AIRCRAFT

CROSS-REFERENCE TO RELATED APPLICATIONS

This application is continuation-in-part of application Ser. No. 10/351,649, filed Jan. 23, 2003, now U.S. Pat. No. 6,786,037 which is a continuation-in-part of application Ser. No. 09/822,962, filed Mar. 30, 2001, now U.S. Pat. No. 6,612,106 which claims priority from provisional application Ser. No. 60/203,222, filed May 5, 2000, abandoned.

FIELD OF THE INVENTION

Jet engines can produce a high noise level if the velocity of the mass flow exiting the engine is non-uniform and high. For performance considerations, jet engines often have multiple nozzles with the mass flow exiting each nozzle at a different velocity. Since noise radiating from a jet's exhaust increases with the intensity and non-uniformity of the exhaust velocity, jet noise reduction concepts have historically focused on methods for rapidly mixing the flows and achieving a uniform velocity within a short distance of the nozzles.

BACKGROUND OF THE INVENTION

Various flow-mixing devices have been employed in the past to achieve a uniform velocity within a jet's exhaust and to reduce the noise radiated from the exhaust flow. While those devices have been successful at reducing jet noise, the thrust, drag, and weight penalty associated with those devices have often been of a magnitude that the noise at constant aircraft performance has not been reduced. During the NASA Advanced Subsonic Transport (AST) Program (reference 1) sharp pointed, triangular shaped, extensions added to the sleeve of an external plug primary nozzle were tested and were found to reduce jet noise. A. D. Young et al. (U.S. Pat. No. 3,153,319, reference 2) also developed extensions that when added to the trailing edge of nozzles reduced jet noise.

The primary difference between the above-described prior art and the hereinafter described invention is the rounding of the upstream intersection of the extensions with the nozzle and the rounding of the extension's trailing edge. Rounding has been found to enhance the reduction of low frequency noise while inhibiting an increase in high frequency noise. Increased high frequency noise has been a characteristic of the previous sharp edged devices even though they have reduced low frequency noise and have had a net acoustic benefit. Rounding has also been found to reduce the thrust loss of the previous sharp edged devices.

BRIEF DESCRIPTION OF THE SEVERAL VIEWS OF THE DRAWING

FIG. 3 is illustrative of a jet engine segmented mixing device with mixed flow nacelle;

FIG. 4 is a triangular planform showing of a segmented mixing device on a nozzle sleeve;

FIG. 4A is a sectional view, taken along the lines 4A—4A of FIG. 4, showing in more detail how the surfaces of the mixing device extensions curve inward towards the engine center line;

FIG. 4B is a sectional view, taken along the lines 4B—4B of FIG. 4, showing in more detail how the extensions create a stream wise vortex;

DETAILED DESCRIPTION OF THE INVENTION

Figure 1:
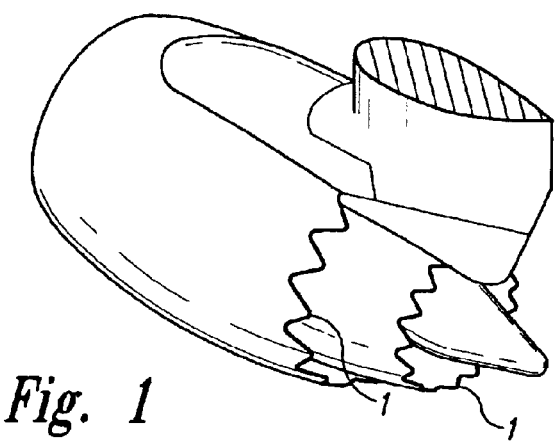
FIG. 1 is a perspective view of a jet engine segmented mixing device having a triangular planform on an external plug nacelle.
Figure 1A:
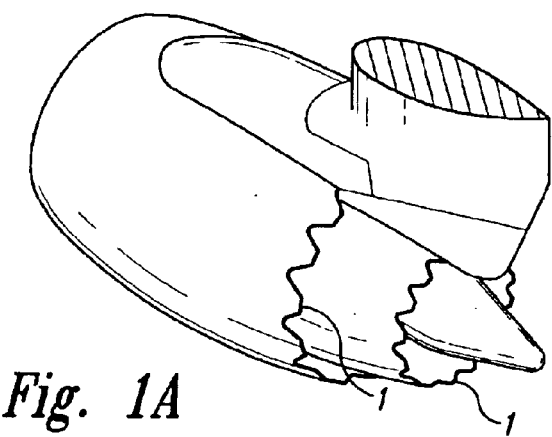
FIG. 1A is a perspective view of a jet engine segmented mixing device having a trapezoidal planform on an external plug nacelle.
Figure 2:
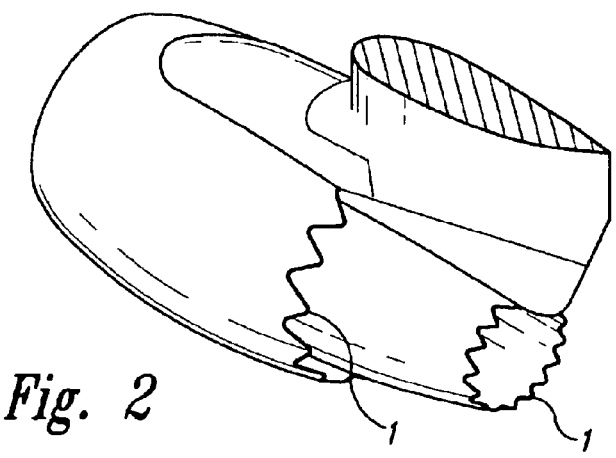
FIG. 2 is illustrative of a jet engine segmented mixing device with internal plug nacelle.
Figure 5:
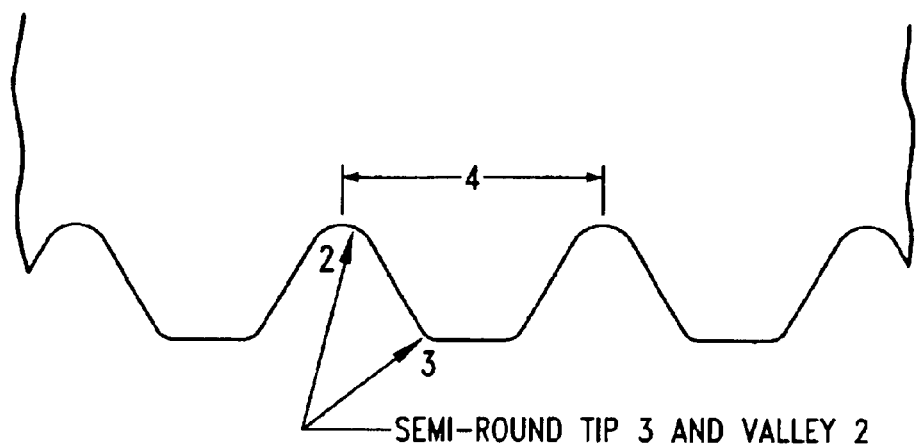
FIG. 5 is a trapezoidal planform showing of a segmented mixing device on a nozzle sleeve.
Figure 7:
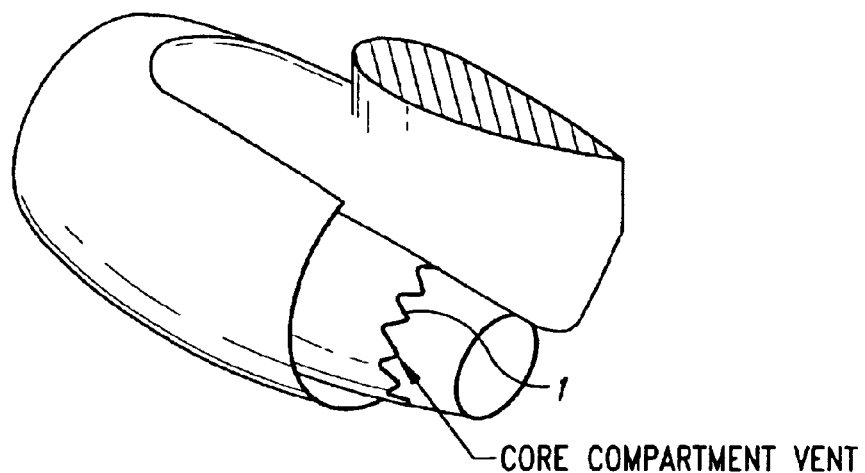
FIG. 7 is illustrative of a jet engine with a segmented mixing device attached to a core compartment vent.
Figure 8:
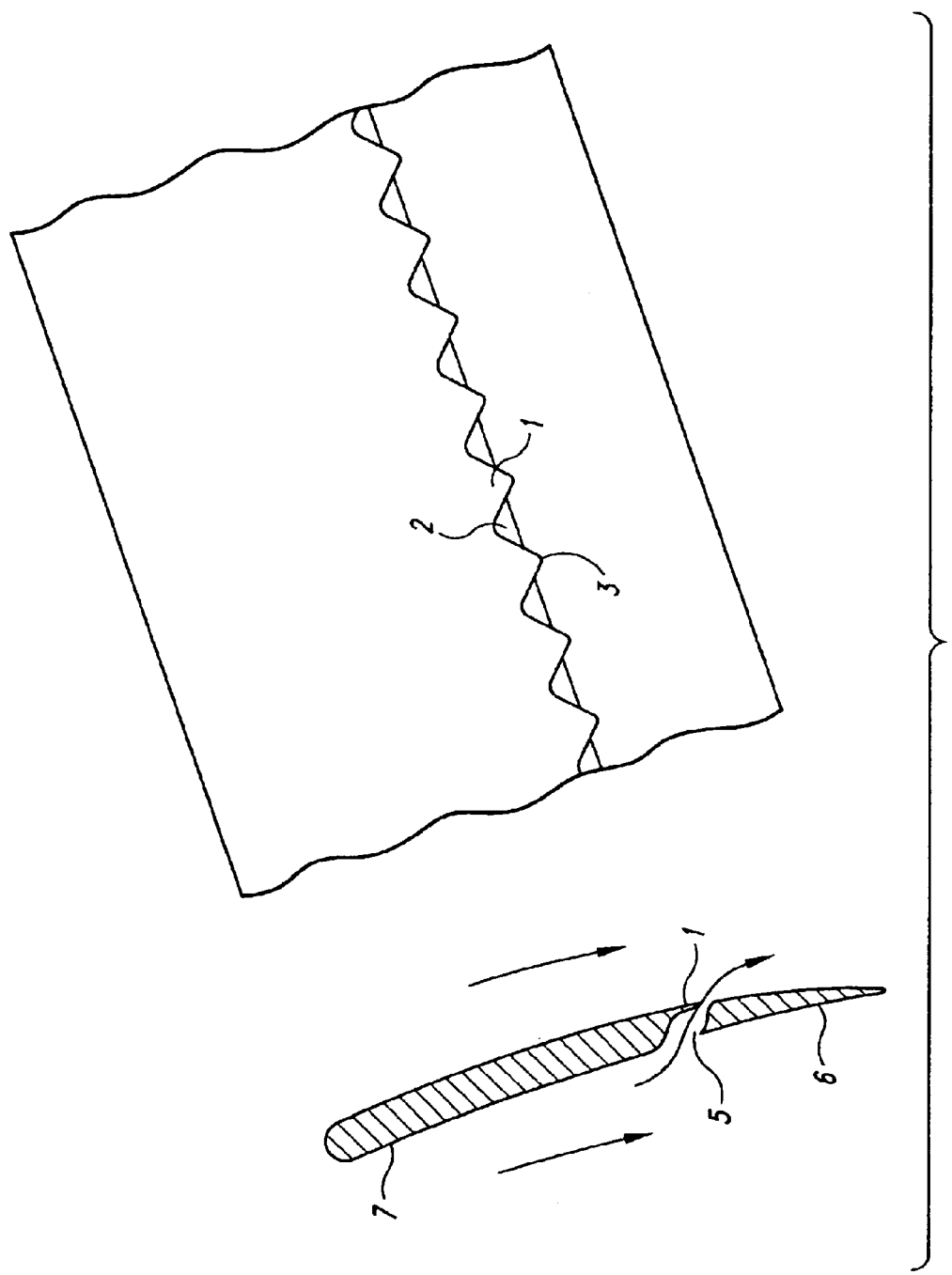
FIG. 8 is illustrative of an aircraft wing with a triangular planform segmented mixing device overhanging the slot between fore and aft airfoils.
Figure 8A:
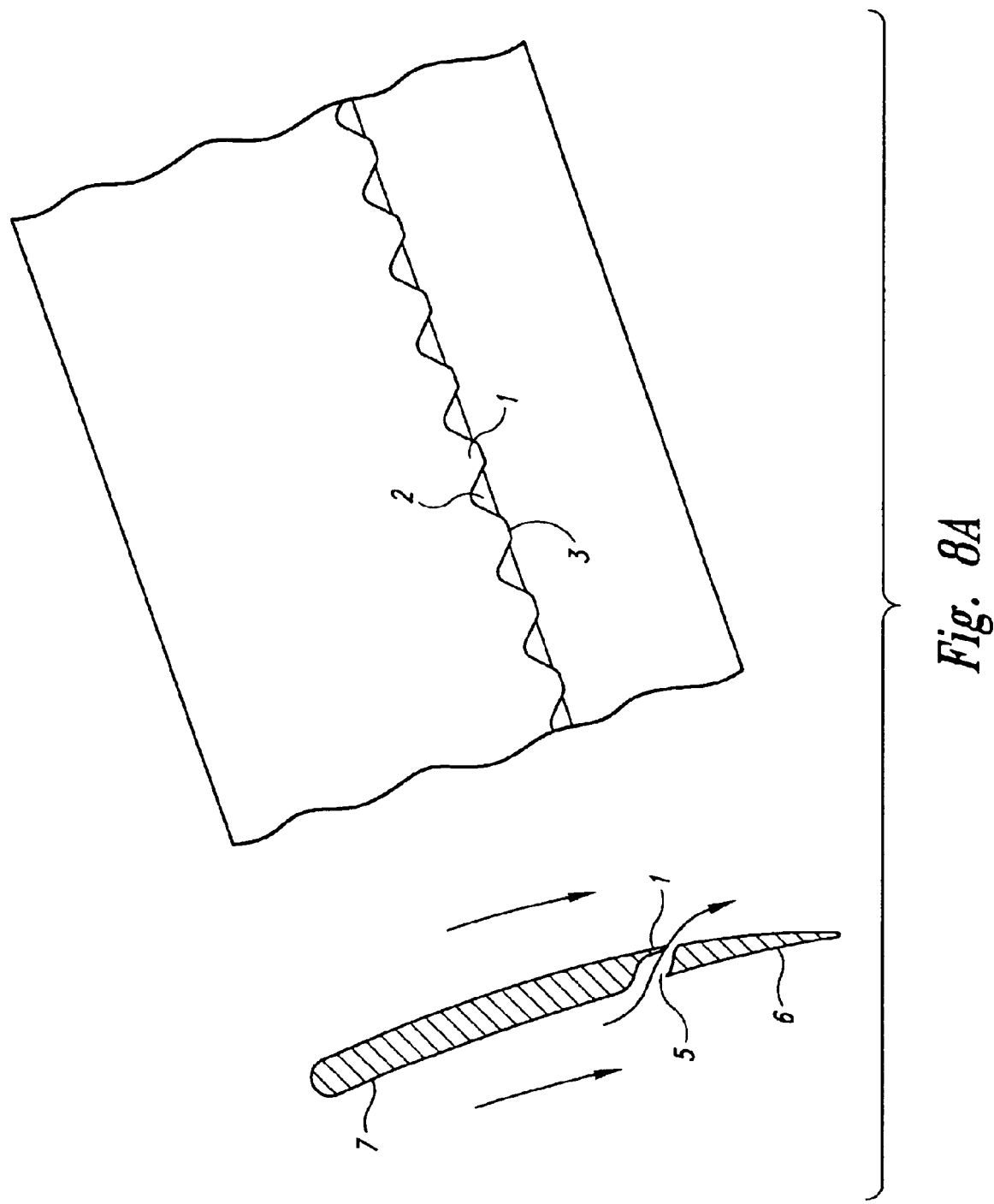
FIG. 8A is illustrative of an aircraft wing with a trapezoidal planform, segmented mixing device overhanging the slot between fore and aft airfoils.

The present invention comprises a segmented mixing device which, when applied to the nozzle of a jet engine or surfaces of an aircraft, enhances mixing between adjacent flows and reduces the noise radiated from the jet's exhaust flow and the flow adjacent to the devices on the aircraft. The device does so with a very small degradation in aircraft performance when attached to the jet's primary nozzles. When the device is attached to secondary nozzles or vents or slotted airfoils, an improvement in engine or aircraft performance can result. The mixing device is a segmented, triangular or trapezoidal shaped, curved extension 1 to a nozzle's sleeve or surface trailing edge which results in a serrated trailing edge (see FIGS. 1, 1A, 2, 3, 7, 8 and 8A). This invention comprises: 1) A modification from the sharp pointed, triangular shaped, nozzle extensions evaluated in the hereinafter referenced NASA AST program to a semi-round, triangular or trapezoidal shaped planform (see FIGS. 4 and 5). 2) An application of the present nozzle extensions to internal and external plug primary nozzles of dual flow exhaust systems (see FIGS. 1, 1A and 2). 3) An application of the nozzle extensions to secondary nozzles of dual flow exhaust systems (see FIGS. 1, 1A and 2). 4) An application of the nozzle extensions to the nozzle of mixed flow exhaust systems and the flow splitter between the primary and secondary streams of those systems (see FIG. 3). 5) An application of the nozzle or surface extensions to vents in exhaust systems (see FIG. 7). 6) An application of the surface extensions to the trailing edge of any surface separating adjacent flows wherein enhanced mixing is desired (as an example, see FIGS. 8 and 8A).

Figure 6:
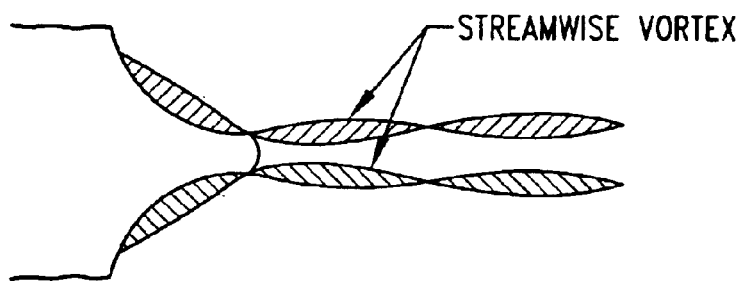
FIG. 6 is illustrative of stream wise vortex flow.

The purpose of the present nozzle or surface extensions 1 is to enhance the natural free mixing of the adjacent flows and to reduce the acoustic energy associated with the velocity differences between the streams in which they are imbedded. The presently configured nozzle or surface extensions enhance the natural free mixing between adjacent streams by forcing the adjacent flows to penetrate into one another to a greater depth than that achievable with free mixing and therefore results in a more uniform flow in a shorter stream wise distance. The acoustic benefit of the extensions increases as the velocity differences between the streams increase. Two methodologies are employed to enhance mixing: 1) The surfaces of the extensions curve inward towards the engine centerline forcing the secondary (outer) flow into the primary (inner) flow (see FIG. 4A). 2) The extensions have a planform shape that creates a stream wise vortex that also enhances rapid mixing of the two streams (see FIG. 4B and FIG. 6). For extensions attached to nozzles, the circumferential shape of the extension's surface is an arc with a radius equal to the distance from the nozzle centerline to the extension's surface, i.e. an axisymetric surface (see FIG. 4B). Outward turned segments can also be used to enhance mixing. However, the thrust loss for outward turned segments on nozzles has been greater than that for inward turned segments. The present concept also includes rounding to outward turned segments.

Unlike the previous NASA AST configurations and the A. D. Young et al. configurations described in U.S. Pat. No. 3,153,319, the extensions defined herein incorporate a planform with semi-rounded intersections 2 with the baseline nozzle and semi-round trailing edges 3. The purpose of the upstream rounding is to increase the strength of the stream wise vortex by allowing the primary (inner) flow to exit the nozzle sooner and in a more radial manner. Rounding the upstream intersection also eliminates the stress concentrations and low fatigue life of the previous NASA AST and A. D. Young et al. concepts. Rounding the extension's trailing edge separates the two stream wise vortexes and increases the circumferential surface area available for the secondary (outer) flow to penetrate the primary (inner) flow. In addition, rounding the trailing edge increases the span-wise average turning angle, $\Theta$ (see FIG. 4A), of the secondary flow resulting in greater penetration of the secondary flow into the primary flow and increased mixing of the two flows. Rounding has been found to enhance the reduction of low frequency noise while inhibiting an increase in high frequency noise. The increase in high frequency noise has been a characteristic of the previous designs. Rounding has also been found to reduce the thrust loss of sharp pointed or small radiused nozzle extensions. The nozzle or surface extensions may vary in length, width, curvature, and count being only constrained by the geometry of the baseline nozzle or the surface to which they are attached.

In addition to using segmented surface extensions to reduce noise, they can be used to reduce drag on surfaces downstream of the segments when those surfaces are scrubbed by the flow that is adjacent to the segments. This is especially beneficial when the flow scrubbing the downstream surface has the lower energy level of the two adjacent flows. The drag reduction is achieved through mixing of the flows adjacent to the segments and the action of the vortexes emanating from the segments. Mixing increases the energy level (total pressure) of the flow having the lowest energy adjacent to the segments. The segmented extensions mix the two flows more rapidly than that achieved with natural free mixing. The enhanced mixing energizes the low energy flow so that it can overcome adverse pressure gradients on the downstream surface. One example of such an application is the flow exiting the core compartment of a jet engine (see FIG. 7). Typically, core compartment flow has a low total pressure relative to ambient, exits through a vent (nozzle), and separates from downstream surfaces when those surfaces encounter higher than ambient pressures. By attaching segments to the outer surface of the vent, the core compartment flow can mix with the adjacent high-energy flow, typically fan flow, and achieve a higher energy (total pressure) in a much shorter distance from the vent than that achieved by natural free mixing. As a result, flow separation on the downstream surface is prevented. Aircraft wings incorporating slots 5 or flaps 6 is another application where drag benefits can be achieved by incorporating segmented surface extensions 1 into the slot between the fore 7 and aft 6 airfoil (see FIGS. 8 and 8A). The vortexes shed from the segments 1 attached to the trailing edge of the upstream airfoil 7 along with the energized slot flow can prevent or delay separation on the aft airfoil 6, reducing the drag and increasing the lift of the wing. On multi-slotted airfoils, the segmented surface extensions 1 can be incorporated into each slot. In the application to slotted airfoils, the segments 1 are an aft extension of the fore 7 airfoil's upper surface such that the extension 1 overhangs the slot 5 between the airfoils and forms the outer boundary of the slot 5 (see FIGS. 8 and 8A). The segmented surface extensions create vortexes by immersing the tip of the extensions into either of the adjacent flows.

What is claimed is:

1. A method for creating vortexes to mix two adjacent flows and reduce noise and drag from a jet engine or aircraft comprising:

a stream-wise segmented nozzle or surface extension having a substantially triangular or trapezoidal saw toothed planform shape with semi-round tips and valleys wherein vortexes are created by immersing the tip of the segmented nozzle or surface extension into either flow adjacent to the nozzle or surface extension.

2. A method for utilizing segmented surface or nozzle extensions on a jet engine according to claim 1, further comprising the steps of:

utilizing said surface extensions on nozzles to reduce noise due to the flows adjacent to the nozzle surfaces; and utilizing said surface extensions to reduce drag on surfaces downstream of the segmented surface extensions when those surfaces are scrubbed by flow adjacent to the segmented surface extensions.

3. A method for utilizing segmented surface extensions on aircraft according to claim 1, further comprising the steps of:

utilizing said surface extensions to reduce noise due to the flows adjacent to the surface extensions flow; and, utilizing said surface extensions to reduce drag on surfaces downstream of the segmented surface extensions when those surfaces are scrubbed by flow adjacent to the segmented surface extensions.

4. Method for creating vortexes to mix flow and reduce noise and drag from a jet engine or aircraft according to claim 1, comprising the steps of:

utilizing said surface extension having unequal tip and valley radii.

5. In combination: a gas flow nozzle or vent; said gas flow nozzle or vent having a trailing edge; and having a stream-wise, segmented surface extension, said extension having a substantially triangular or trapezoidal saw toothed planform shape with semi-round tips and valleys for enhancing the reduction of noise due to the flow exiting the nozzle or vent and for enhancing engine thrust.

6. The combination according to claim 5, wherein said extension has unequal tip and valley radii.

7. In combination: an aircraft; said aircraft having a wing with a slot between fore and aft airfoils; and said fore airfoil incorporating a stream-wise segmented trailing edge extension such that the extension overhangs the slot is forms the outer boundary of said slot; and said extension having a substantially triangular or trapezoidal saw toothed planform shape with semi-rounded tips and valleys for enhancing the reduction of noise due to the flow adjacent to said extension and for reducing the drag and increasing the lift of the wing.

8. The combination according to claim 7, wherein said extension has unequal tip and valley radii.

* * * * *